July 2, 1940.  H. L. BOWERS  2,206,475
CONTROL UNIT
Filed Feb. 17, 1939  2 Sheets-Sheet 1
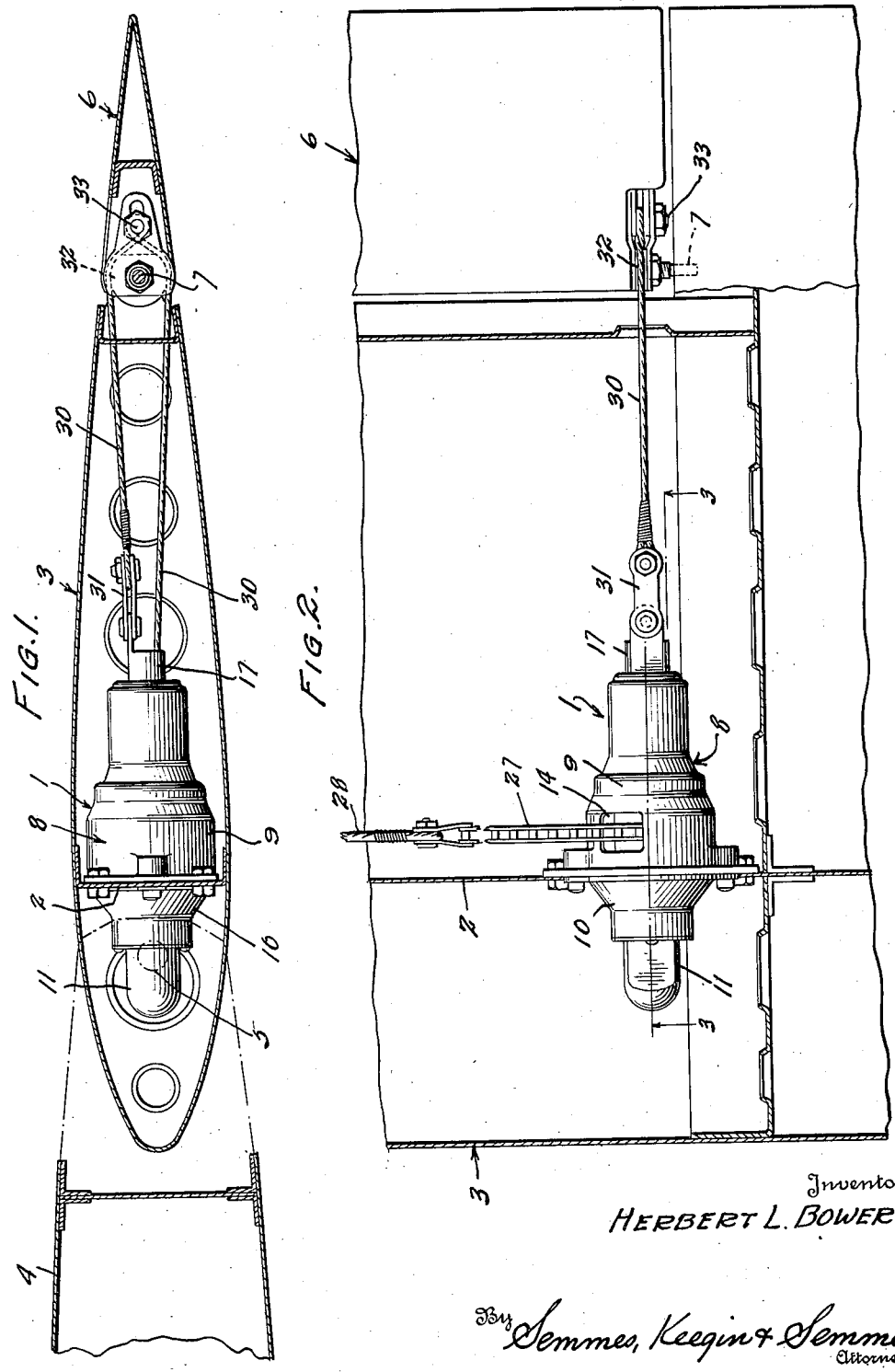
Inventor
HERBERT L. BOWERS
By Semmes, Keegin & Semmes
Attorneys July 2, 1940.  H. L. BOWERS  2,206,475
CONTROL UNIT
Filed Feb. 17, 1939  2 Sheets-Sheet 2
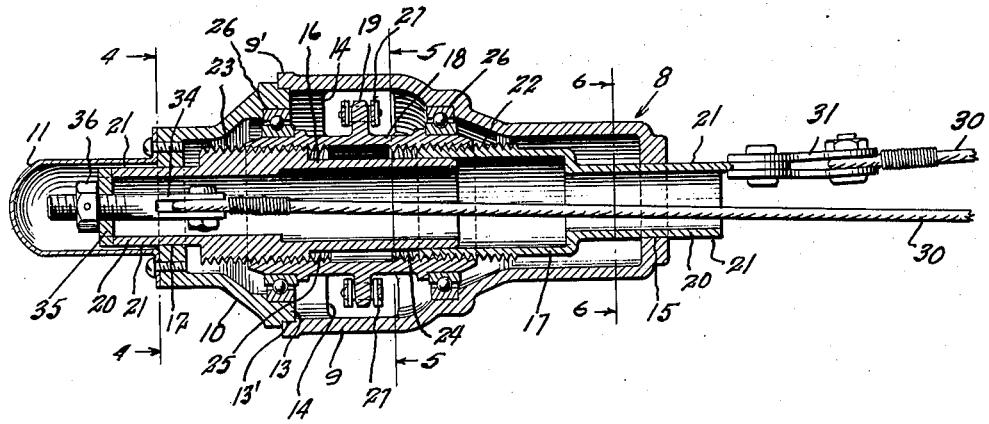
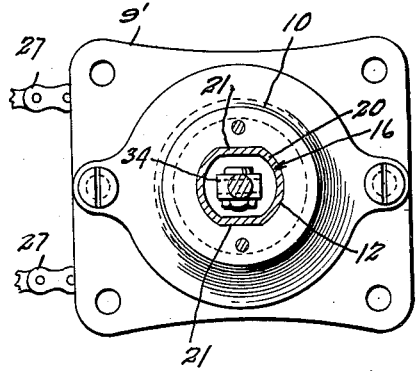
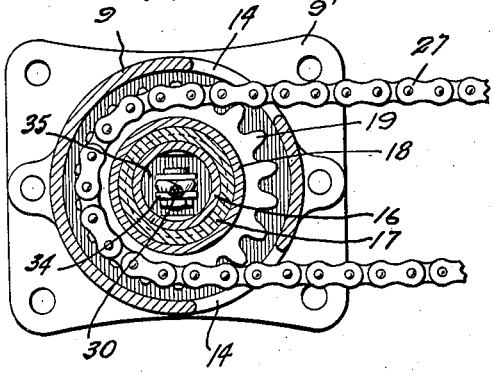
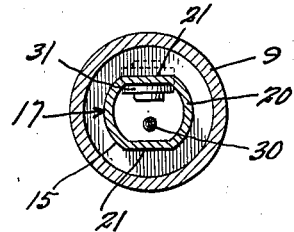
Inventor
HERBERT L BOWERS
By Semmes, Keegin & Semmes
Attorneys Patented July 2, 1940

2,206,475

UNITED STATES PATENT OFFICE 2,206,475

CONTROL UNIT

Herbert L. Bowers, Kenmore, N. Y., assignor to Bell Aircraft Corporation, Buffalo, N. Y., a corporation of New York Application February 17, 1939, Serial No. 257,012

5 Claims. (Cl. 244—83)

This invention relates to control devices, and more especially to a unit which may be mounted in a control surface of an airplane and which is designed to operate the trimming tab attached to the said control surface.

One of the objects of my invention is to provide a control unit which is mounted in a control surface of an airplane and which is so designed that, by its operation, angular motion can be transmitted to a trimming tab pivotally mounted on said control surface.

Still another object of my invention is to provide a control unit which is sufficiently compact in construction and light in structure to permit it to be mounted within the control surface of an airplane.

A further object of my invention is to provide a control unit to operate a trimming tab, said control unit being irreversible in action in order to eliminate flutter in the trimming tab.

With these and other objects in view, my invention embraces the concept of providing a control unit which is so constructed that it may be mounted in a control surface of an airplane without interfering with the efficient operation of the said control surface. My control unit consists of a housing in which is rotatably mounted an expansible unit which consists of a sleeve having internally threaded extremities which form a connection between two tubular members, each of which has an externally threaded portion.

The parts of the expansible unit are threaded in such a manner that a movement of the threaded hub of the sprocket will cause the tubular members to either telescope or move in opposite directions. The movement of the tubular members relative to each other is transmitted to the trimming tab by means of cables which are attached to the unthreaded ends of the tubular members.

While for purposes of illustration I have shown the control unit, which forms the subject of this invention, mounted in one of the elevators of an airplane and operatively attached to one of the trimming tabs, it is intended that a similar unit be mounted on the elevator which forms the opposite side of the empennage. In this manner the trimming tabs mounted on each of the stabilizers may be operated by means of separate units.

Moreover, although I have shown my control unit mounted in an elevator, it is obvious that it may be mounted in the rudder or ailerons of the airplane and operatively connected to the trimming tabs attached to these control surfaces.

In the drawings:

Figure 1 is a view in side elevation showing my control unit mounted on a beam of an elevator control.

Figure 2 is a top plan view of the arrangement shown in Figure 1.

Figure 3 is a view taken along line 3—3 of Figure 2 looking in the direction of the arrows.

Figure 4 is a view taken along line 4—4 of Figure 3 looking in the direction of the arrows.

Figure 5 is a view taken along line 5—5 of Figure 3 looking in the direction of the arrows.

Figure 6 is a view taken along line 6—6 of Figure 3 looking in the direction of the arrows.

For purposes of illustration I have shown my control unit, which is generally designated by the numeral 1, mounted in operative position upon the cross beam 2 of an elevator 3. The elevator 3 is pivotally mounted on the stabilizer 4 of an airplane, as indicated at 5, and is provided with a trimming tab 6 which is pivotally mounted on the elevator 3 by means of suitable hinges, one of which is indicated at 7.

While I have only shown one of my control units, it is intended that a similar unit be mounted in the elevator which is situated on the opposite side of the empennage of the airplane. As best shown in Figure 3, the control unit 1 is provided with a divided cylindrical housing 8 which comprises a rearwardly projecting portion 9 and a forwardly projecting portion 10, the open end of which is closed by a cap 11. The forward end of the portion 10 is provided with a centrally located aperture 12 and its opposite end is formed with a spigot 13. This spigot 13 is adapted to engage a socket 13' situated on the forward end of the portion 9 in such a manner as to form an aligning fit when the two portions are joined. The portion 9 of the housing 8 is stepped, and its lower end, which is adjacent the portion 10, is provided with peripheral apertures 14. The reduced end of the portion 9 is provided with a centrally located aperture 15 which is in line with the aperture 12 in the forward portion 10. The portion 9 is flanged, as at 9', to provide means for attaching the unit 1 to the beam 2 of the control surface 3.

Contained within the housing 8 is an expansible structure which comprises a pair of telescoping tubular members 16 and 17 which are in screw-threaded engagement with a rotatable sleeve 18 which is provided with an integral sprocket 19. The outer ends 20 of each of the tubular members 16 and 17 are provided with diametrically opposed flat ends 21 and pass through the apertures 12 and 15, respectively. The apertures 12 and 15 are formed to correspond with the cross-sectional contour of the ends 20 of the tubular members 16 and 17 to permit only linear movement of these tubular members 16 and 17. The inner ends of the member 17 and the intermediate portion of the member 16 are externally threaded opposite the disposed screw threads 22 and 23, respectively. These screw threads engage internal threads 24 and 25 formed in the sleeve 18. The opposite ends of the sleeve 18 carry anti-friction bearings 26 which are in turn carried by the housing 8.

The sprocket 19 engages a chain 27, the free ends of which are attached to cables 28 which extend to an operating device which is not shown, but which may be located conveniently for use of the pilot.

By means of this construction, rotary movement of the sleeve 18 through the cables 28, chain 27 and sprocket 19 will impart linear movement to the tubular members 16 and 17. This movement will cause the members either to separate or telescope. This action, however, is not reversible. In other words, linear movement of the tubular members cannot be transferred to rotary movement of the sleeve 18.

The control unit 1 is operatively connected to the trimming tab 6 by means of a flexible cable 30. One end of this cable 30 is connected to the projecting end of the tubular member 17 by means of a shackle 31. The cable end passes over a spool 32 located on the hinge line of the trimming tab 6 and under a clamping bolt 33 positioned rearwardly of the spool 32. After passing around the bolt 33, the cable passes under the spool 32 and extends forwardly and through the tubular members 16 and 17 where it is attached to an adjustable yoke 34. The yoke 34 is adjustably attached to an end plate 35 screwed to the projecting end of the member 16 by means of a bolt 36.

By means of this connection, the trimming tab 6 may be raised or lowered by the tension to which the cable 30 is subjected because of the linear movement of the tubular members 16 and 17. Moreover, by this construction proper operating tension is given to the cable 30 to prevent flutter of the trimming tab 6 when it is in its normal or zero position.

While for purposes of illustration I have described one form of my control unit, it is obvious that the form can be varied or mechanical equivalents substituted without departing from the spirit of this invention. I wish it understood, therefore, that I intend that this invention be only limited by the prior art and the scope of the appended claims.

I claim:

1. In a device for governing the movement of a control surface of an airplane, a control device mounted within an airfoil, said control device being connected to the said control surface by means of connecting links, comprising a rotatably mounted sleeve having threaded internal portions, a pair of tubular members coaxially aligned, each of said tubular members being provided with an externally threaded portion, said tubular members being mounted within the sleeve in such a manner that the threaded portions of the tubular members engage the threaded portions of the sleeve, whereby a movement of the sleeve in one direction will cause the tubular members to telescope and a movement of the sleeve in the other direction will cause the members to separate, each of said tubular members being attached to one of the said links, whereby a lineal movement of the tubular members will result in a selective movement of the control surface.

2. In a device for governing the movement of a control surface of an airplane, a control device mounted within an airfoil of the airplane, said control device being connected to the said control surface by means of connecting links, comprising a rotatably mounted sleeve the extremities of which are internally threaded, a device mounted on the sleeve by means of which it can be rotated, and a pair of tubular members coaxially aligned, each of said tubular members being provided with an externally threaded portion and each of said threaded portions being adapted to engage one of the threaded extremities of the sleeve, whereby a motion of the sleeve in one direction will cause the tubular members to telescope and a movement of the sleeve in the other direction will cause the members to separate, one of the said connecting links being attached directly to one of the tubular members and the other connecting link passing through both of the tubular members and being attached to the remaining tubular member, whereby a rotative movement of the sleeve will impart a lineal movement to the tubular members which results in a selective movement of the control surface.

3. In a device for governing the movement of a control surface of an airplane, a control device mounted within an airfoil of the airplane, said control device being connected to the said control surface by means of connecting links, comprising a rotatably mounted sleeve the extremities of which are internally threaded, a device mounted on the sleeve by means of which it can be rotated, and a pair of tubular members coaxially aligned, each of said tubular members being provided with an externally threaded portion and each of said threaded portions being adapted to engage one of the threaded extremities of the sleeve, whereby a motion of the sleeve in one direction will cause the tubular members to telescope and a movement of the sleeve in the other direction will cause the members to separate, one of said connecting links being attached directly to the extremity of the exteriorly disposed tubular member and the other passing through both tubular members and being attached to the inwardly disposed tubular member, whereby a rotative movement of the sleeve will impart a lineal movement to the tubular members which results in a selective movement of the control surface.

4. In a device for governing the movement of a control surface of an airplane, a control device mounted within an airfoil of the airplane, said control device being connected to the said control surface by means of connecting links, comprising a housing, a sleeve rotatably mounted in the housing, said sleeve consisting of a hub the extremities of which are internally threaded, a sprocket concentrically mounted on the hub, and a pair of tubular members coaxially aligned, a threaded portion on the exterior of one extremity of the outer of the two tubular members and a threaded portion on the exterior of the inner tubular member adjacent its center portion, said threaded portions on the two members being oppositely disposed and each being adapted to engage one of the threaded extremities of the hub, one of said links being attached to the unthreaded extremity of the exteriorly disposed tubular member and the other passing through both tubular members and being attached to the extremity of the interiorly disposed tubular member at the point furthest removed from the other member, whereby the rotative movement of the sleeve imparts a lineal movement to the tubular members which results in a selective movement of the control surface.

5. In a device for governing the movement of a control surface of an airplane, a control device mounted within an airfoil of the airplane, said control device being connected to the said control surface by means of connecting links, comprising a housing provided with peripherally disposed apertures, a sleeve rotatably mounted within the housing on bearings which are carried by the housing, said sleeve being composed of a hub, a sprocket concentrically mounted on the hub, said sprocket being provided with teeth which are aligned with said apertures, a chain for operating the said sleeve carried by the teeth; and a pair of members which are coaxially aligned, a threaded portion on the exterior of the extremity of the exteriorly disposed member and a threaded portion on the exterior of the interiorly disposed member adjacent its center portion, said threaded portions being oppositely disposed and each of said threaded portions being adapted to engage one of the threaded extremities of the hub, whereby rotative movement of the sleeve will cause a lineal movement of the tubular members, apertures in the housing through which the opposed extremities of the tubular members extend, one of said links being attached directly to the extremity of the exteriorly disposed tubular member and the other passing through both of the tubular members and being attached to the interiorly disposed tubular member, whereby a rotative movement of the sleeve will impart a lineal movement to the tubular members which results in a selective movement of the control surface.

HERBERT L. BOWERS.